United States Patent [19]

McLaughlin et al.

[11] Patent Number: 5,475,289
[45] Date of Patent: Dec. 12, 1995

[54] METHOD AND APPARATUS FOR CONTROLLING AN ELECTRIC ASSIST STEERING SYSTEM USING TWO-DIMENSIONAL INTERPOLATION FOR CURRENT COMMANDS

[75] Inventors: Kevin M. McLaughlin, Troy; Mark W. Gluch, Grosse Ile, both of Mich.

[73] Assignee: TRW Inc., Lyndhurst, Ohio

[21] Appl. No.: 334,243

[22] Filed: Nov. 4, 1994

[51] Int. Cl.$^6$ .................................................. H02P 7/00
[52] U.S. Cl. ........................ 318/432; 318/251; 318/701; 180/791; 180/142; 364/424.05; 388/907.5; 388/930
[58] Field of Search ................... 364/424.01, 424.05; 180/79.1, 141–142; 318/432–434, 254, 701; 388/809–815, 907.5, 932

[56] References Cited

U.S. PATENT DOCUMENTS

| | | | |
|---|---|---|---|
| 3,794,900 | 2/1974 | Kobayashi et al. | 318/603 |
| 4,660,671 | 4/1987 | Behr et al. | 180/79.1 X |
| 4,681,181 | 7/1987 | Shimizu | 180/79.1 |
| 4,688,655 | 8/1987 | Shimizu | 180/79.1 |
| 4,702,335 | 10/1987 | Cage et al. | 180/142 |
| 4,745,984 | 5/1988 | Shimizu | 180/79.1 |
| 4,800,974 | 1/1989 | Wand et al. | 180/79.1 |
| 4,837,692 | 6/1989 | Shimizu | 364/424.05 |
| 4,922,427 | 5/1990 | Yokote et al. | 180/79.1 |
| 5,257,828 | 11/1993 | Miller et al. | 180/79.1 |
| 5,257,828 | 11/1993 | Miller et al. | 364/424.05 |

Primary Examiner—David S. Martin
Attorney, Agent, or Firm—Tarolli, Sundheim & Covell

[57] ABSTRACT

A control arrangement for an electric assist steering system having a variable reluctance motor (26) includes sensing (54) motor position and sensing (110) applied steering torque. A controller determines a desired motor torque assist value in response to the applied steering torque. A plurality of look-up tables are provided having a plurality of motor current values versus motor position values stored therein. The stored motor current values are functionally related to motor position values. The controller selects a first (T1) and second (T2) torque look-up table from the plurality of look-up tables. The first look-up table corresponds to a torque value less than the desired motor torque assist value. The second look-up table corresponds to a torque value greater than the desired motor torque assist value. A first motor current value (I1) is determined by interpolating between two current values corresponding to two motor positions stored in the first look-up table closest to the sensed motor position. A second motor current value (I2) is determined by interpolating between two current values corresponding to two motor positions stored in the second look-up table closest to the sensed motor position. A final motor current value (ICMD) is determined by interpolating between the first and second determined motor current values. A motor control signal is provided in response to the determined final motor current value.

10 Claims, 2 Drawing Sheets

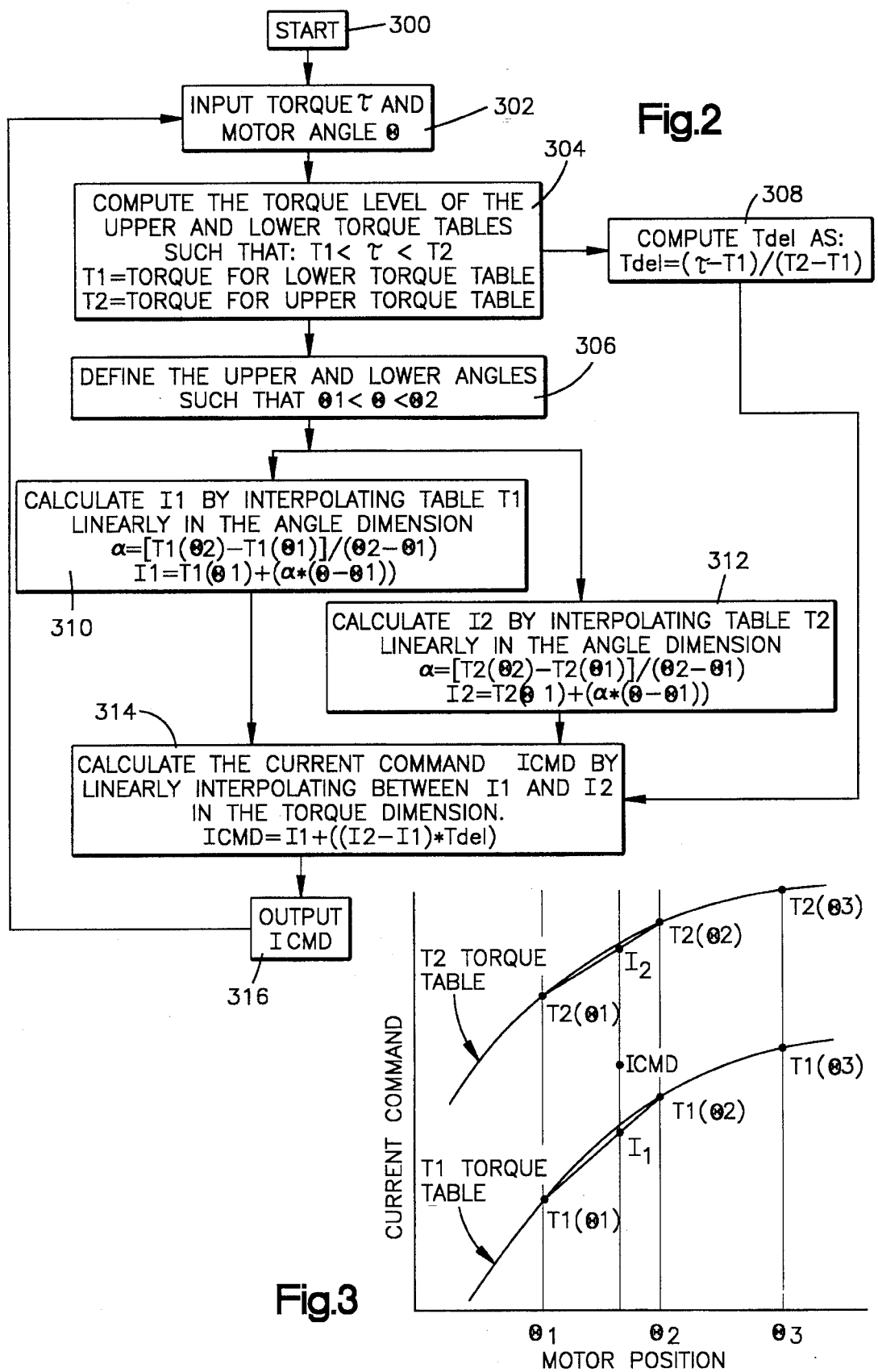

METHOD AND APPARATUS FOR CONTROLLING AN ELECTRIC ASSIST STEERING SYSTEM USING TWO-DIMENSIONAL INTERPOLATION FOR CURRENT COMMANDS

TECHNICAL FIELD

The present invention is directed to an electric assist steering system and is particularly directed to a method and apparatus for controlling an electric assist steering system to improve steering feel and decrease steering motor noise.

BACKGROUND OF THE INVENTION

Electric assist steering systems are well known in the art. Electric assist steering systems that utilize a rack and pinion gear set provide assist by using an electric motor to either (i) apply rotary force to a steering input shaft connected to a pinion gear, or (ii) apply linear force to a steering member having rack teeth thereon. The electric motor in such systems is typically controlled in response to (i) a driver's applied torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. An electronic control system includes a torque sensor and a vehicle speed sensor. A computer receives the output signals provided by both sensors. The computer controls the amount of the assistance provided by the motor dependent upon the applied steering torque and the sensed vehicle speed.

U.S. Pat. No. 4,415,054 to Drutchas (now U.S. Re. Pat. No. 32,222,), assigned to TRW Inc., includes a D.C. electric assist motor driven through an H-bridge arrangement. The motor includes a rotatable armature encircling a steering member which has a thread convolution portion and a portion having straight cut rack teeth thereon. Rotation of the electric assist motor armature causes linear movement of the steering member through a ball-nut drive arrangement drivably coupled to the thread convolution portion of the steering member. A torque sensing device is coupled to the steering column to sense driver applied input torque to the steering wheel. The torque sensing device uses a Hall-effect sensor for sensing relative rotation between the input and output shafts across a torsion bar. An electronic control unit ("ECU") monitors the signal from the torque sensing device and controls the electric assist motor in response thereto. A vehicle speed sensor provides a signal to the ECU indicative of the vehicle speed. The ECU controls current through the electric assist motor in response to both the sensed vehicle speed and the sensed applied steering torque. The ECU decreases steering assist as vehicle speed increases. This is commonly referred to in the art as speed proportional steering.

U.S. Pat. No. 4,660,671 discloses an electric controlled steering system that is based on the Drutchas steering gear. In the '671 arrangement, the D.C. motor is axially spaced from the ball-nut and is operatively connected thereto through a connection tube. The electronic controls includes a plurality of diagnostic features that monitor the operation of the steering system. If an error in the operation of the electric assist steering system is detected, the assist system is disabled and steering reverts to an unassisted mode.

U.S. Pat. No. 4,794,997 to North, assigned to TRW Cam Gears Limited, discloses an electric assist steering system having an electric motor operatively connected to the rack through a ball nut. A vehicle speed sensor and an applied steering torque sensor are operatively connected to an ECU. The ECU controls electric current through the motor as a function of both applied steering torque and sensed vehicle speed. The current is controlled by controlling the percentage of the pulse-width-modulated ("PWM") signal applied to the motor. As the PWM increases, assist increases. The ECU or computer is preprogrammed with discrete control curves that provide steering assist values (PWM values), also referred to as torque-out values, as a function of applied steering torque, also referred to as torque-in values, for a plurality of predetermined discrete vehicle speed values. Each vehicle speed value has an associated torque-in vs. torque-out control curve.

FIG. 3 of the '997 patent shows torque-in vs. torque-out control curves stored in the ECU. There is a torque-in vs. torque-out curve used for low speed vehicle maneuvering such as vehicle parking. Also, there is a torque-in vs. torque-out curve used for high speed maneuvering. Each of these control curves permits maximum assist should the applied steering torque reach an associated value. For vehicle speeds between the minimum speed curve and the maximum speed curve, a plurality of discrete curves are provided. The other discrete vehicle speed curves are all between the low and high speed curves. From these torque-in vs. torque-out curves, it can be seen that assist decreases as vehicle speed increases. The transition from one level of assist to another level of assist for the different vehicle speeds occurs in steps or jumps. Changes in assist level in this type of system can be felt by the vehicle operator when vehicle speed changes occur during a steering maneuver.

It is desirable to use a variable reluctance motor to provide electric assist for steering. One arrangement is disclosed in U.S. Pat. No. 5,257,828 to Miller et al. that uses a variable reluctance motor in an electric assist steering system. In accordance with the '828 patent, current to the motor, referred to as a current command signal, is functionally related to applied steering torque, vehicle speed, motor rotor position, and speed of the electric assist motor.

One concern with using a variable reluctance motor to provide steering assist is the amount of acoustic noise produced by the motor during energization. Current profile mapping tables are stored in memory. These current maps include current values vs. rotor position values. The current maps are designed to provide smooth motor operation, i.e., reduce motor torque ripple during motor operation.

The amount of noise and ripple occurring upon energization of the electric assist motor is functionally related to the number of data values stored in the mapping table. The larger the "space" between motor position vs. current values in the table, the more noise that occurs upon motor energization. To store enough values in a current map to ensure a quiet motor operation, requires a substantial amount of memory. Consideration of system size and expense dictates that a current mapping table be limited to a finite size not large enough to provide quiet motor operation. Because of a limited amount of memory in a system, a current value is selected from the look-up table corresponding to the closest motor position value in the table. This type of control results in an increase in audible motor noise.

In a four pole, variable reluctance electric motor, it has been found that audible noise is present during energization of the motor using a current mapping table having stored current values as a function of motor positions where the motor position increments are as small as every 0.5 electrical degrees (or every 0.083 mechanical degrees). When a current table has stored current values for discrete motor positions, only step changes in motor current can occur. These step changes are a major contributor to audible noise in the motor.

SUMMARY OF THE PRESENT INVENTION

The present invention is directed to a method and apparatus for controlling an electric assist steering system in which a motor current command is determined by interpolating a current value based upon both applied steering torque and motor position.

In accordance with the present invention, an apparatus is provided for controlling a steering assist system that provides steering assist in response to a steering control signal. The steering assist system includes a variable reluctance motor. The apparatus includes motor position sensing means for sensing the relative position between the motor's rotor and stator. First and second torque look-up tables are provided in which each of the first and second torque look-up tables have motor current values that vary as a function of motor position. Control means is operatively connected to the motor position sensing means. The control means (i) determines a first motor current value by interpolating between two current values corresponding to the two motor positions stored in the first look-up table closest to the sensed motor position, (ii) determines a second motor current value by interpolating between two current values corresponding to two motor positions stored in the second look-up table closest to the sensed motor position, and (iii) determines a final motor current value by interpolating between the first and second determined motor current values. A motor control signal is provided in response to the determined final motor current value.

In accordance with a preferred embodiment of the present invention, an apparatus is provided for controlling a steering assist system in response to a steering control signal. The steering assist system includes a variable reluctance motor. The apparatus includes a motor position sensor for sensing the relative position between the motor's rotor and stator. Applied steering torque is sensed. A desired motor torque assist value is determined in response to the applied steering torque. A plurality of motor torque look-up tables are provided. Each of the motor torque look-up tables has motor current values that vary as a function of motor position. First and second torque look-up tables are selected from the plurality of look-up tables wherein the first look-up table corresponds to a torque value less than the desired motor torque assist value and the second look-up table corresponds to a torque value greater than the desired motor torque assist value. A first motor current value is determined by interpolating between two current values associated with two motor positions stored in the first look-up table closest to the sensed motor position. A second motor current value is determined by interpolating between two current values associated with two motor positions stored in the second look-up table closest to the sensed motor position. A final motor current value is determined by interpolating between the first and second determined motor current values. A motor control signal is provided in response to the determined final motor current value.

In accordance with another aspect of the present invention, a method for controlling a steering assist system in response to a steering control signal is provided. The steering assist system includes a variable reluctance motor. The method comprises the steps of sensing motor position by sensing the relative position between the motor's rotor and stator, providing first and second torque look-up tables, each of the first and second torque look-up tables having motor current values that vary as a function of motor position, determining a first motor current value by interpolating between two current values corresponding to the two motor positions stored in the first look-up table closest to the sensed motor position, determining a second motor current value by interpolating between two current values corresponding to the two motor positions stored in the second look-up table closest to the sensed motor position, determining a final motor current value by interpolating between the first and second determined motor current values, and providing a motor control signal in response to the determined final motor current value.

In accordance with a preferred embodiment of the present invention, a method for controlling a steering assist system that provides steering assist using a variable reluctance motor in response to a steering control signal is provided. The method comprises the steps of sensing motor position by sensing the relative position between the motor's rotor and stator, sensing applied steering torque, determining a desired motor torque assist value in response to the sensed applied steering torque, providing a plurality of motor torque look-up tables, each of the motor torque look-up tables has motor current values that vary as a function of motor position, selecting first and second torque look-up tables from the plurality of look-up tables wherein the first look-up table corresponds to a torque value less than the determined desired motor torque value and the second look-up table corresponds to a torque value greater than the determined desired motor torque value, determining a first motor current value by interpolating between two current values corresponding with two motor positions stored in the first look-up table closest to the sensed motor position, determining a second motor current value by interpolating between two current values corresponding with two motor positions stored in the second look-up table closest to the sensed motor position, determining a final motor current value by interpolating between the first and second determined motor current values, and providing a motor control signal in response to the determined final motor current value.

BRIEF DESCRIPTION OF THE DRAWINGS

Other features and advantages of the present invention will become apparent to those skilled in the art to which the present invention relates from a reading of the following detailed description with reference to the accompanying drawings, in which:

FIG. 2 is a flow diagram illustrating the control process followed by the drive control circuit of FIG. 1; and FIG. 3 is a graphical representation of the current command values determined by the drive control circuit of FIG. 1.

DESCRIPTION OF PREFERRED EMBODIMENT

Figure 1:
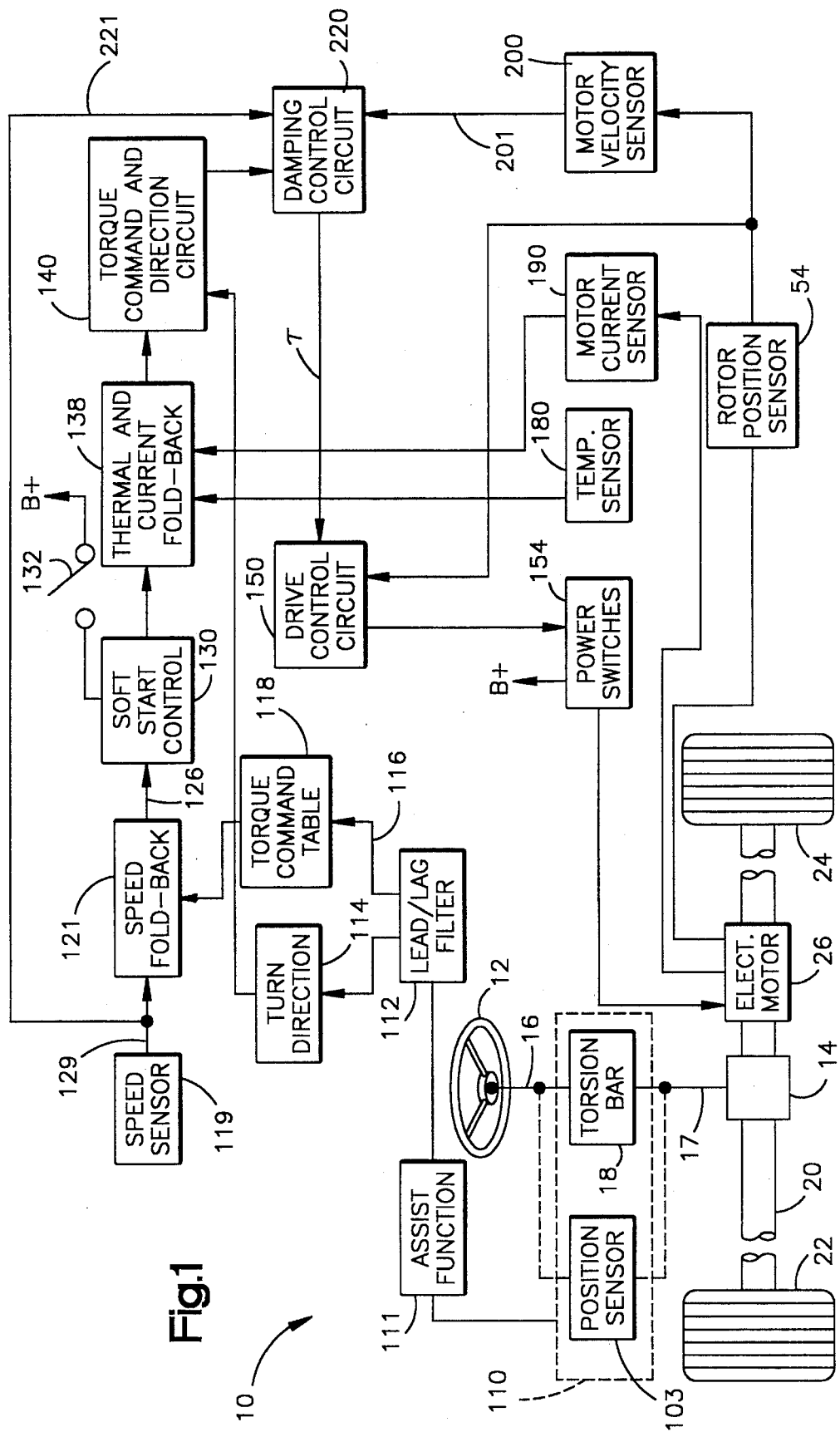
FIG. 1 is a schematic block diagram illustrating an electric assist steering system in accordance with the present invention.

Referring to FIG. 1, an electric assist steering system 10 includes a steering wheel 12 operatively connected to a pinion gear 14. Specifically, the vehicle steering wheel 12 is connected to an input shaft 16 and the pinion gear 14 is connected to an output shaft 17. The input shaft 16 is operatively coupled to the output shaft 17 through a torsion bar 18. The torsion bar 18 twists in response to applied steering torque thereby permitting relative rotation between the input shaft 16 and the output shaft 17. Stops, not shown, limit the amount of such relative rotation between the input and output shafts in a manner well known in the art.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axis and the vehicle is steered.

An electric assist motor 26 is drivingly connected to the rack 20. When the electric assist motor 26 is energized, it provides steering assist so as to aid in the rotation of the vehicle steering wheel 12 by the vehicle operator. In accordance with a preferred embodiment of the present invention, the electric assist motor 26 is a variable reluctance motor. A variable reluctance motor is desirable for use in an electric assist steering system because of its small size, low friction, and its high torque-to-inertia ratio.

The motor 26 preferably is a four pole motor in which the stator has four pole pairs and the rotor has six rotor poles. The operation of a variable reluctance motor and its principle of operation are well known in the art. Basically, the stator poles are energized in pairs. The rotor moves so as to minimize the reluctance between the energized stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized. The direction of motor rotation is controlled by the sequence in which the stator coils are energized. The torque produced by the motor is controlled by the current through the stator coils. Current through the stator coils is controlled by pulse-width-modulation ("PWM") techniques well known in the art. Current is supplied to the motor by pulse-width-modulating power switches connected between a source of electrical energy and the motor. A preferred manner for controlling a variable reluctance motor in an electric assist steering system is fully disclosed in U.S. Pat. No. 5,257,828, to Miller et al., and assigned to TRW Inc., and which is hereby fully incorporated herein by reference.

The electric assist motor 26 is drivably connected to the rack member 20 preferably with a ball-nut drive arrangement. Such an arrangement is fully described in the above-mentioned Drutchas U.S. Pat. No. 4,415,054, now U.S. Re. Pat. No. 32,222, which is hereby fully incorporated herein by reference. Basically, when the motor is energized, the rotor turns which, in turn, rotates the nut portion of the ball-nut drive arrangement. When the nut rotates, the balls transfer a linear force to the rack. The direction of rack movement is dependent upon the direction of rotation of the motor.

A rotor position sensor 54 is operatively connected to the motor rotor and to the motor stator or motor housing. The function of the rotor position sensor is to provide an electrical signal indicative of the position of the motor's rotor relative to the motor's stator. For proper operation of the variable reluctance motor, including direction of rotation and applied torque, it is necessary to know the position of the rotor relative to the stator. A detailed structure of a rotor position sensor is described in the above-incorporated '828 patent to Miller et al. It is contemplated that other types of rotor position sensors may be used with the present invention.

In a preferred embodiment of the present invention, a physical rotor position sensor is provided. It is also known that rotor position can be determined by means other than a physical position sensor. For example, it is possible to monitor the current through the non-energized stator coils and, based upon the sensed current, the rotor position determined. One specific arrangement for sensing rotor position without a separate position sensor is disclosed in U.S. Pat. No. 5,072,166 which is hereby fully incorporated herein. The present invention contemplates the use of both a separate position sensor and an algorithm that determines the rotor position based on some measured operating parameter, such as current in an non-energized coil.

A steering position sensor 103 is operatively connected across the input shaft 16 and the output shaft 17 and provides an electrical signal having a value indicative of the relative rotational position between the input shaft 16 and the output shaft 17. The position sensor 100, in combination with the torsion bar 18, form a torque sensor 110. The output of the position sensor 103 is indicative of the steering torque applied to the vehicle steering wheel 12 by the vehicle operator.

The output of the torque sensor 110 is connected to a torque assist function circuit 111. The torque assist function circuit 111 outputs a signal having a value functionally related to the applied steering torque wherein the functional relationship is designed to enhance steering feel. One functional relationship contemplated between the output of 111 and the input of applied steering torque is a "smile" curve. Other contemplated relationships include those disclosed in pending U.S. patent application to McLaughlin Ser. No. 246,947, filed May 20, 1994 and U.S. patent application to McLaughlin et al. Ser. No. 212,112, filed Mar. 11, 1994, both of which are hereby fully incorporated herein by reference.

The output of the assist function 111 is connected to a lead/lag filter 112. The lead/lag filter 112 processes the torque signal and separates it into a direction signal 114 and a magnitude signal 116. In processing the torque signal, the lead/lag filter 112 amplifies the value of torque signal.

Those skilled in the art will realize that filtering of the output of the torsion sensor signal may be distributed differently about the torque command table 118 than is specifically shown and described. For example, the output of the assist function circuit 111 may be directly connected to the table 118 and the filtering 112 occurring at the output of the table.

The torque magnitude value 116 is converted to a torque command signal preferably by use of a first torque look-up table 118 based upon the torque magnitude. The torque command is a value indicative of a desired torque assist from the electric assist motor. This value is also referred to as the torque demand. The output of the torque command table 118 is connected to a speed fold-back circuit 121. A vehicle speed sensor 119 is operatively connected to the vehicle and has an output 129. Speed sensor 119 provides a signal 129 having a value indicative of the vehicle's speed. Those skilled in the art appreciate that a vehicle speed sensor includes a device connected to the vehicle wheels or to the vehicle transmission that generates pulses at a frequency that is a function of the vehicle speed. The speed sensor further includes circuitry that converts the pulse frequency into a signal having a value indicative of the vehicle speed.

Output 129 of the speed sensor 119 is operatively connected to the speed fold-back circuit 121 and to a damping control circuit 220. The output 129 of speed sensor 119 and the output from the torque command table 118 are combined in speed fold-back circuit 121. As is well known in the art, the amount of assist desired for a vehicle steering system decreases as vehicle speed increases. Therefore, to maintain a proper or desirable feel for all steering maneuvers, it is desirable to decrease the amount of steering assist as the vehicle speed increases. This is accomplished using the speed fold-back circuit 121 in a manner known in the art. The output 126 of the speed fold-back circuit is a torque command signal that is "corrected" as a function of vehicle speed.

The output 126 is connected to a soft start control circuit 130. The soft start control circuit 130 is also operatively connected to the vehicle ignition switch 132 for detection of when the vehicle is first started. The purpose of the soft start control circuit is to prevent full assist from being provided to the vehicle the instant the vehicle is being started. It is not uncommon for the vehicle operator to be applying torque to the steering wheel with one hand while he is turning the ignition switch to the starting position. If full assist were immediately available, the steering wheel would jerk in his hand. The soft start circuit prevents this unpleasant event from happening and simulates the operation of a hydraulic assist steering system which does not provide full assist until the vehicle motor is running at speed (as opposed to cranking speed).

The output of the soft start circuit, after an initial time delay for starting of the vehicle, is the torque demand or request signal "corrected" for vehicle speed. The output of the soft start circuit is connected to a thermal and current fold-back circuit 138 that further modifies the torque request signal as a function of the current through the motor as sensed by a motor current sensor 190 and the temperature of the switches 154 used to drive the motor or temperature of the main system controller. The temperature fold-back circuit reduces the value of the torque demand output from the soft start control 130 as sensed temperature increase above a predetermined value.

The output of the fold-back circuit 138 is connected to the torque command and direction circuit 140. The direction signal 114 is also connected to the torque command and direction circuit 140. The circuit 140 recombines the torque direction signal with the torque demand signal that has been "corrected" for (i) vehicle speed, (ii) soft start, (iii) sensed motor current, and (iv) sensed temperature of the switches or controller. The output of the torque command and direction circuit 140 is connected to the damping control circuit 220.

The output τ of the damping control circuit 220 is connected to a drive control circuit 150. The output of the motor position sensor 54 is also connected to the drive control circuit 150. Based upon the output of the damping control circuit 220, which is functionally related to the value of the output of the torque command and direction circuit 140 and based upon the position of the rotor, the drive control circuit 150 provides a motor control signal used to control energization of the electric assist motor 26 in terms of sequence and current applied to the stator coils through a plurality of switches 154.

The drive control circuit 150 is preferably is a microcomputer. Commutation or drive pulses may need to be output to the stator windings at a rate faster than the motor position data can be processed from the sensor 54 to insure smooth operation of the variable reluctance motor. To solve this problem, it is preferable that the position of the rotor be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, Nov. 6–8, 1985, both papers being hereby fully incorporated herein by reference.

As mentioned, the temperature sensor 180 is operatively connected to either the switches 154 of each coil pair, which are connected to a common heat sink, or to the microcomputer. The output of the temperature sensor 180 is connected to the thermal and current fold-back circuit 138. If the temperature of the switches 154 or controller is too high, i.e., greater than a predetermined value, the torque demand signal is decreased to prevent damage to the switches or controller.

As also mentioned, the motor current sensor 190 is operatively connected to the electric motor 26 for sensing the amount of current therethrough. The output of the current sensor 190 is connected to the thermal and current fold-back circuit 138. If the sensed current through the motor is too high, i.e., greater than a predetermined value, the value of the torque demand signal is decreased to prevent the switches from burning out.

The output from the rotor position sensor 54 is also connected to a motor velocity sensor circuit 200. The change in the rotor position as a function of time (differential) is indicative of the rotor and, in turn, the motor velocity. The output of the motor velocity sensor 200 is an electric signal having a value indicative of the motor speed and sign, i.e. direction, of rotation. Rather than differentiating the rotor position, i.e., change in rotor position as a function of time, those skilled in the art will appreciate that other velocity sensing arrangements could be used to determine rotor speed and direction of rotation such as a tachometer connected to the rotor or a curve fitting arrangement using look-up tables.

Velocity sensor 200 has an output 201 connected to the damping control circuit 220. The output 201 of sensor 200 provides a signal indicative of motor velocity. The motor velocity signal has both a magnitude component and a direction of rotation component.

Damping control circuit 220 outputs a damped torque command and direction signal τ to the drive control circuit 150. The torque command signal is damped an amount functionally related to the value of the sensed motor velocity and the value of the sensed vehicle speed. The damping function on the torque command signal can either be a linear or a non-linear function of sensed vehicle speed and sensed motor velocity. To improve system stability, damping is low at low vehicle speeds and low motor velocity. Damping increases when vehicle speed remains low and motor velocity increases. As both vehicle speed and motor velocity increase, the damping also increases. Damping is fully discussed in the above-incorporated '828 patent to Miller et al.

It should be appreciated that the damping is functionally related to the motor rate feed-back and is also functionally related to the sensed vehicle speed. One would like an electric assist system to simulate at least the feel of a hydraulic system.

Referring to FIGS. 2 and 3, the control process, in accordance with the present invention, for controlling the assist motor current will be better appreciated. As mentioned, preferably, the drive control circuit 150 is embodied in a microcomputer. The microcomputer has stored therein a plurality of torque tables. These torque tables have motor current values as a function motor position stored therein. In accordance with one preferred embodiment of the present invention, there are ten torque tables designated T1 through T10. Each of the torque tables have associated discrete values of desired motor current associated with discrete motor position values $\Theta$ that will achieve the desired torque assist. Desired motor current values are functionally related to motor position values. The output from the damping control circuit 220 is referred to as the desired torque assist. This output represents the torque command that is further corrected to provide yaw rate stability.

The torque table T1 is for minimal applied steering torque conditions and the torque table T10 is for the maximum anticipated applied steering torque. Since these applied torque table represent 10 different applied steering torque values, the desired torque value $\tau$ output from the damping control circuit 220 will typically fall between two of these 10 discrete torque values. Recall that the value $\tau$ output from the damping control circuit 220 is the desired torque assist which is functionally related to the applied steering torque.

For purposes of illustration below, it is assumed that the torque value $\tau$ falls between torque values T1 and T2 where T1<$\tau$<T2. Each of the 10 torque look-up tables have stored current values that vary as a function of sensed motor position $\Theta$. The motor position values $\Theta$ in the table are also discrete values. Therefore, a typical measured motor position angle $\Theta$ will fall between two discrete angle values stored in the table. Although the graphs of the tables T1 and T2 are shown as continuous curves, it will be appreciated that discrete current command values are stored for discrete motor positions.

For the purposes of illustration below, it is assumed that the motor position angle $\Theta$ is between two values $\Theta 1$ and $\Theta 2$ where $\Theta 1<\Theta<\Theta 2$.

The process begins in step 300 where the microcontroller initializes itself in a manner well known in the art. During this initialization stage, volatile internal memories are cleared, registers are set to initial values, flags are set to initial conditions, etc. The process proceeds to step 302 where the torque value $\tau$ and the motor position $\Theta$ are both monitored by the drive control circuit 150. The torque value $\tau$ is the damped torque value output from the damping control circuit 220 which, as monitored, is functionally related to the applied steering torque. The motor position value $\Theta$ is the value output from the rotor position sensor 54.

The process proceeds to step 304 where it is determined between which two torque values the torque $\tau$ falls. As mentioned, for the purpose of illustration, it is assumed that the torque value $\tau$ falls between torque values T1 and T2. Therefore, these two torque tables are used in determining the current command to the electric assist motor. The process then proceeds to step 306 where the upper and lower values of motor position are determined, i.e., between which two stored angle positions does the measured motor position fall.

Simultaneously, a value Tdel is determined in accordance with $$Tdel = \frac{(\tau - T1)}{(T2 - T1)} \quad (1)$$

in step 308.

From step 306, the process proceeds to step 310 where a first current value I1 is calculated based upon an interpolated value from the first torque table T1. To determine I1, current values are determined for the lower motor position $\Theta 1$ and for upper motor position value $\Theta 2$. The value for I1 is the interpolated current value between the lower determined value and the upper determined value. The lower determined value from the T1 look-up table is designated T1($\Theta 1$) and the upper determined value from the T1 look-up table is designated T1($\Theta 2$). The interpolation is done linearly in the angle dimension. The interpolated angle can be expressed as follows:

$$\alpha = \frac{T1(\Theta 2) - T1(\Theta 1)}{(\Theta 2 - \Theta 1)} \quad (2)$$

so that the current value I1 may be expressed as:

$$I1 = T1(\Theta 1) + (\alpha \times (\Theta - \Theta 1)) \quad (3)$$

where $\Theta$ is the present motor position.

A second current value I2 is similarly determined in step 312. The second current value I2 is calculated based upon an interpolated value from the second torque table T2. To determine I2, current values are determined for the lower motor position $\Theta 1$ and for upper motor position value $\Theta 2$. The value for I2 is the interpolated current value between the lower determined value and the upper determined value. The lower determined value from the T2 look-up table is designated T2($\Theta 1$) and the upper determined value from the T2 look-up table is designated T2($\Theta 2$). The interpolation is done linearly in the angle dimension. The interpolated angle can be expressed as follows:

$$\alpha = \frac{T2(\Theta 2) - T2(\Theta 1)}{(\Theta 2 - \Theta 1)} \quad (4)$$

so that the current value I2 may be expressed as:

$$I2 = T2(\Theta 1) + (\alpha \times (\Theta - \Theta 1)) \quad (5)$$

After the two current values I1 and I2 are determined from the two torque tables T1 and T2, respectively, the final motor command current ICMD is determined by another interpolation in step 314. Again this is a linear interpolation using the term Tdel determined in step 308. The final motor command current ICMD may be expressed as follows:

$$ICDM = I1 + ((I2 - I1) \times Tdel) \quad (6)$$

After the determination of the final current command value ICMD in step 314, the current command is output in step 316 by the drive control circuit 150. The drive control circuit 150 pulse-width-modulates the power switches 154 so as to achieve this determined current value in the electric assist motor. The process then loops back to step 302.

Those skilled in the art will appreciate that the motor current is controlled in accordance with this invention in an infinitely smooth manner from look-up tables having a finite set of stored data values. This arrangement significantly reduces audible noise from the electric assist motor.

Those skilled in the art will further appreciate that the interpolation shown and described herein is linear interpolation. The present invention also contemplates that non-linear interpolation may be used.

It should further be appreciated that it is desirable to include self-diagnostic features in the drive control circuit to insure proper operation of the assist arrangement. Such a diagnostic arrangement for electric assist steering systems is fully described in U.S. Pat. No. 4,660,671 which is hereby fully incorporated herein by reference.

From the above description of the invention, those skilled in the art will perceive improvements, changes, and modifications. Such improvements, changes, and modifications within the skill of the art are intended to be covered by the appended claims.

Having fully described the invention, the following is claimed:

1. An apparatus for controlling a steering assist system, said steering assist system providing steering assist in response to a steering control signal, said steering assist system including a variable reluctance motor, said apparatus comprising:

motor position sensing means for sensing the relative position between the motor's rotor and stator;

first and second torque look-up tables, each of said first and second torque look-up tables having motor current values that vary as a function of motor position;

control means operatively connected to said motor position sensing means, said control means (i) determining a first motor current value by interpolating between two current values corresponding to the two motor positions stored in the first look-up table closest to the sensed motor position, (ii) determining a second motor current value by interpolating between two current values corresponding to the two motor positions stored in the second look-up table closest to the sensed motor position, and (iii) determining a final motor current value by interpolating between the first and second determined motor current values; and providing a motor control signal in response to said determined final motor current value.

2. The apparatus of claim 1 wherein said control means includes means to determine said first motor current value, said second motor current value, and said final motor current value using linear interpolation.

3. An apparatus for controlling a steering assist system, said steering assist system providing steering assist in response to a steering control signal, said steering assist system including a variable reluctance motor, said apparatus comprising:

motor position sensing means for sensing the relative position between the motor's rotor and stator;

torque sensing means operatively connected to a vehicle hand wheel for sensing applied steering torque;

motor torque assist determining means for determining a desired motor torque assist value in response to the sensed applied steering torque;

a plurality of motor torque look-up tables, each of said motor torque look-up tables having a plurality of motor current values that vary as a function of motor position;

control means operatively connected to said motor torque assist determining means and to said motor position sensing means, said control means (i) selecting a first and second torque look-up table from said plurality of look-up tables wherein said first look-up table corresponds to a torque value less than the desired motor torque assist value and said second look-up table corresponds to a torque value greater than the desired motor torque assist value, (ii) determining a first motor current value by interpolating between two current values associated with the two motor positions stored in the first look-up table closest to the sensed motor position, (iii) determining a second motor current value by interpolating between two current values associated with the two motor positions stored in the second look-up table closest to the sensed motor position, and (iv) determining a final motor current value by interpolating between the first and second determined motor current values; and providing a motor control signal in response to said determined final motor current value.

4. The apparatus of claim 3 wherein each of said torque tables has stored therein a non-linear functional relationship between motor current values and motor position values.

5. The apparatus of claim 4 wherein said control means includes means to determine said first motor current value, said second motor current value, and said final motor current value using linear interpolation.

6. A method for controlling a steering assist system, said steering assist system providing steering assist in response to a steering control signal, said steering assist system including a variable reluctance motor, said method comprising the steps of:

sensing motor position by sensing the relative position between the motor's rotor and stator;

providing first and second torque look-up tables, each of said first and second torque look-up tables having a plurality of motor current values that vary as a function of motor position;

determining a first motor current value by interpolating between two current values corresponding to the two motor positions stored in the first look-up table closest to said sensed motor position;

determining a second motor current value by interpolating between two current values corresponding to the two motor positions stored in the second look-up table closest to said sensed motor position;

determining a final motor current value by interpolating between the first and second determined motor current values; and providing a motor control signal in response to said determined final motor current value.

7. The method of claim 1 wherein said steps of determining said first motor current value, said second motor current value, and said final motor current value using linear interpolation.

8. A method for controlling a steering assist system, said steering assist system providing steering assist in response to a steering control signal, said steering assist system including a variable reluctance motor, said method comprising the steps of:

sensing motor position by sensing the relative position between the motor's rotor and stator;

sensing applied steering torque;

determining a desired motor torque assist value in response to the sensed applied steering torque;

providing a plurality of motor torque look-up tables, each of said motor torque look-up tables having a plurality of motor current values that vary as a function of motor position;

selecting a first and second torque look-up table from said plurality of look-up tables wherein said first look-up table corresponds to a torque value less than the determined desired motor torque assist value and said second look-up table corresponds to a torque value greater than the determined desired motor torque assist value;

determining a first motor current value by interpolating between two current values corresponding with two motor positions stored in the first look-up table closest to the sensed motor position;

determining a second motor current value by interpolating between two current values corresponding with two motor positions stored in the second look-up table closest to the sensed motor position;

determining a final motor current value by interpolating between the first and second determined motor current values; and providing a motor control signal in response to said determined final motor current value.

9. The method of claim 8 wherein said step of providing said plurality of look-up tables includes providing each of said tables with motor current values that have a non-linear functional relationship between motor current values and motor position values stored therein.

10. The method of claim 9 wherein said steps of determining said first motor current value, said second motor current value, and said final motor current value use linear interpolation.

* * * * *